(12) United States Patent
Jacob et al.

(10) Patent No.: US 11,421,797 B2
(45) Date of Patent: Aug. 23, 2022

(54) ACTUATORS FOR HYDRAULIC VALVE

(71) Applicant: ECO Holding 1 GmbH, Marktheidenfeld (DE)

(72) Inventors: Thomas Jacob, Stuttgart (DE); Johannes Krebs, Ebersbach (DE); Diana Neufeld, Stuttgart (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 0 days.

(21) Appl. No.: 16/932,780

(22) Filed: Jul. 19, 2020

(65) Prior Publication Data
US 2021/0041036 A1 Feb. 11, 2021

(30) Foreign Application Priority Data
Aug. 5, 2019 (DE) .......................... 102019121090.9

(51) Int. Cl.
*F16K 31/06* (2006.01)
(52) U.S. Cl.
CPC ...... *F16K 31/0675* (2013.01); *F16K 31/0644* (2013.01); *F16K 31/0686* (2013.01)
(58) Field of Classification Search
None
See application file for complete search history.

(56) References Cited

U.S. PATENT DOCUMENTS

| 4,251,788 A * | 2/1981 | Barth ................... H01H 51/065 335/131 |
| 4,526,340 A * | 7/1985 | Kolchinsky ............... H01F 7/16 251/38 |
| 8,791,780 B2 * | 7/2014 | Boban ........................ H01F 7/16 335/281 |
| 11,069,467 B2 * | 7/2021 | Kuramochi ......... F16K 31/0613 |
| 2001/0042663 A1 | 11/2001 | Haynes |
| 2007/0017587 A1 * | 1/2007 | Groschel ............. F16K 31/0675 137/625.65 |
| 2009/0297375 A1 * | 12/2009 | Inoue .................... F04B 7/0076 417/460 |
| 2016/0305571 A1 * | 10/2016 | Meisiek .................... H01F 7/16 |
| 2020/0203049 A1 * | 6/2020 | Schudt .................... H01F 7/081 |
| 2021/0202146 A1 * | 7/2021 | Feindler .............. F16K 31/0603 |

FOREIGN PATENT DOCUMENTS

| DE | 102006054941 B3 | 5/2008 |
| DE | 102009049108 A1 | 4/2011 |
| DE | 102011053033 | 2/2013 |
| DE | 102017124485 A1 | 4/2019 |

* cited by examiner

*Primary Examiner* — Umashankar Venkatesan
(74) *Attorney, Agent, or Firm* — Von Rohrscheidt Patents

(57) ABSTRACT

An actuator for a hydraulic stroke or pressure control valve for a motor vehicle, the actuator including a magnetisable actuator housing that envelops a magnet coil; a pole group arranged in a receiving opening of the actuator housing, wherein the pole group includes a pole core and a pole tube, wherein an axially movable armature is arranged in an inner cavity of the pole group, wherein the armature is configured to axially move a piston of the hydraulic valve by a pin that is supported axially movable in the pole group, wherein the actuator is configured to perform an anti-stick function and a contact damping function, wherein the pin directly contacts a first armature face of the armature that is oriented towards the pin, and wherein the pin is configured axially movable relative to the armature.

9 Claims, 4 Drawing Sheets

ACTUATORS FOR HYDRAULIC VALVE

RELATED APPLICATIONS

This application claims priority from and incorporates by reference German patent application DE 10 2019 121 090.9 filed on Aug. 5, 2019 which is incorporated in its entirety by this reference.

FIELD OF THE INVENTION

The invention relates to an actuator for a hydraulic valve and to a hydraulic valve, in particular a hydraulic stroke and pressure control valve for a motor vehicle.

BACKGROUND OF THE INVENTION

It is known in the art to use electromagnetic actuators to move a piston, e.g. a piston of a hydraulic stroke or pressure control valve. The actuator includes an armature that is received axially movable in an essentially hollow cylindrical pole group. Thus, the armature can move axially in the cylindrical space that is enveloped by the pole group wherein this space is filled with the hydraulic fluid. The space is essentially closed, this means the hydraulic fluid has to flow from one side of the armature to the other side of the armature when the armature is moved, which causes a pressure drop. Thus, a force is imparted upon the armature that is oriented against the movement of the armature wherein the force is a function of speed and designated as damping. In order for a dynamic stability of a movement of the armature to be controllable it is required for the damping to be adjustable. Furthermore no undesirably high damping should occur since the damping influences dynamics and thus operations of the hydraulic valve. The movement of the armature is transferred by an axially movable pin onto the piston of the hydraulic valve, wherein the pin is advantageously in operative contact with the piston through a surface contact or a punctiform contact.

Typically a damping element including contact damping and/or an anti-stick element is provided which is fixed at the armature by compressing or injection molding.

An actuator is known from the publication document DE 10 2011 053 033 A1 wherein the actuator includes a damping element that is fixed in a pass through opening that penetrates the armature in the axial direction, wherein the damping element is configured as a disc which includes a flowable aperture in the portion of the pass through opening. The damping element is pressed into the pass through opening supported by bars that protrude into the pass through opening of the armature. The pin is configured integrally in one piece with the piston.

The patent document DE 10 2006 054 941 B3 discloses an actuator which includes a pin that is received in an armature of the actuator wherein the armature includes a damping element configured as a pressure balancing opening in order to provide the damping. The pin includes an anti-stick element which releases the pressure balancing opening that is provided in the armature.

The publication document DE 10 2009 049 108 A1 discloses an actuator which includes an anti-stick element that is integrally configured with a pin, wherein the pin and the damping element are made from sheet metal. The pin includes clip element for fixing in the armature wherein the clip elements provide a fixed connection with the armature. The damping element is configured as the flowable pin.

BRIEF SUMMARY OF THE INVENTION

Thus, it is an object of the invention to provide an actuator that provides reliable actuation of a piston, wherein the actuator is producible in a cost effective manner. It is another object of the invention to provide a cost effective hydraulic valve.

The object is achieved by an actuator for a hydraulic stroke or pressure control valve for a motor vehicle, the actuator including a magnetisable actuator housing that envelops a magnet coil; a pole group arranged in a receiving opening of the actuator housing, wherein the pole group includes a pole core and a pole tube, wherein an axially movable armature is arranged in an inner cavity of the pole group, wherein the armature is configured to axially move a piston of the hydraulic valve by a pin that is supported axially movable in the pole group, wherein the actuator is configured to perform an anti-stick function and a contact damping function, wherein the pin directly contacts a first armature face of the armature that is oriented towards the pin, and wherein the pin is configured axially movable relative to the armature. Advantageous embodiments and advantages of the invention can be derived from the dependent claims the description and the drawing figure.

An actuator is proposed for a hydraulic valve in particular for a hydraulic stroke and pressure control valve for a motor vehicle, wherein the actuator includes a magnetisable actuator housing that envelops a magnet coil. A pole group is arranged in a housing opening of the actuator housing, wherein the pole group includes at least a pole core and a pole tube. An axially movable armature is arranged in an interior cavity of the pole group wherein the armature is configured to axially move a movable piston of the hydraulic valve by a pin that is supported axially movable in the pole group. The actuator is configured to perform an anti-stick function and a contact damping function. According to the invention the pin directly contacts a face of the armature that is oriented towards the pin, wherein the pin is configured axially movable relative to the armature. This means put differently that the pin directly contacts the armature without being fixed at the armature e.g. by compressing or a clip connection like in the prior art. Therefore the pin is axially movable relative to the armature. By the same token this means that the pin contacts the armature without an additional element, e.g. an anti-stick element connected there between. An essential advantage which causes improved operational reliability and an increased service life is that the pin is not pressed into the armature or otherwise fixed at the armature or another component like e.g. the anti-stick element has to be pressed into the armature or fixed at the armature which eliminates a risk of contamination or residual contamination. Contact damping can also be provided e.g. in that a pass through opening is provided in the armature and arranged adjacent to the pin.

In one embodiment of the actuator according to the invention the armature includes a pass through opening that is coaxial with the pin and that extends through an entirety of the actuator wherein the pass through opening has a diameter that is smaller than a first exterior diameter of the pin. This means put differently that the pin covers the pass through opening of the armature. The pass through opening is e.g. configured so that a swift movement of the armature is possible in the pole group that is filled with the hydraulic fluid. This pass through opening has a rather large diameter which is typically partially closed by the anti-stick element or by a contact damping element. In order to provide a secure contact of the pin at the armature the pin has a first outer diameter which is larger than the diameter of the pass through opening. Since the pin has a larger contact surface on the armature than the prior art pin smaller surface loading and thus higher stability of the pin can be provided. Furthermore the larger diameter of the pin provides a loss safety which supports the pin reliably in a support disc of the pole group after assembly of the pin.

The pin has a first outer diameter at an end of the pin that is oriented towards the armature, wherein the first outer diameter is greater than a second outer diameter of the pin that is configured in a portion of s support of the pin. This means put differently that the pin can be nail shaped with a pin head, wherein the pin head is the portion of the pin that contacts the armature and the remaining portion of the pin is configured to be supported in a support disc that is received in the pole group. Thus, the small diameter of the pin is configured to reduce friction since a support surface of the pin in the support disc is smaller in the portion of the smaller diameter than this would be case with the larger diameter. An additional loss safety is provided during assembly and operations since the pin portion that is oriented towards the armature is greater than the pin portion that is supported in the support disc since the pin cannot move through the support opening that is ideally adapted to the second exterior diameter since the larger pin portion comes in contact.

In another embodiment of the actuator according to the invention the pin includes at least one recess at an end that is oriented towards the armature in order to implement the contact damping, wherein the recess is flow connected with the pass through opening that extends through an entirety of the armature. Thus, a damping element is advantageously configured by the at least one recess of the pin together with the pass through opening of the armature. Thus, hydraulic fluid can be run through the damping element into the armature and out of the armature in a simple manner. Another essential advantage is that the recess does not have any outward oriented limitation by the pin like e.g. a hole which is entirely surrounded by material about a circumference of the pin. The damping element thus configured implements an ideal aperture which almost has no thickness which reduces a temperature dependency of the damping caused by the hydraulic fluid to a minimum.

Furthermore the recess of the pin automatically facilitates a flow around for large strokes so that the damping is substantially independent from a position of the armature. The recess in the armature and pin thus implements the contact damping so that an additional fabrication step can be omitted which reduces cost.

In another embodiment at least two recesses are configured wherein the recesses are evenly spaced in the circumferential direction. When there is an even number of recesses in the pin they are advantageously arranged in a symmetrical pattern. This arrangement of the recesses relative to each other facilitates a flow through of the armature and the pin and an advantageously entirely axial movement of the pin in order to operate the hydraulic valve reliably.

Advantageously the recess has a circumferential opening angle of 180° at the most. This means put differently that the pin contacts the armature with at least half a surface that is oriented towards the armature in order to reliably transfer a force. This means additionally that openings have an entire opening angle of 180° at the most if plural openings are provided. It has proven advantageous that recesses respectively have an opening angle of 50° when three recesses are provided.

In order to reduce cost even further the anti-stick function is provided by an essentially disc shaped non-magnetic anti-stick element. Thus, the anti-stick element is advantageously configured as a first exterior diameter of the pin.

Thus the actuator advantageously has a simple configuration due to the pin and the multiple functions of the pin so that a number of fabrication steps and components of the actuator is reduced which significantly reduces fabrications costs.

According to another aspect the invention relates to a hydraulic valve including a control valve and an actuator moving the control valve wherein the actuator is configured as described supra. Advantageously the hydraulic has valve has the advantages associated with the actuator, thus reliable operations and economical fabrication.

It is appreciated that the support disc can be joined with the pole core after the pole group that includes the pole core and the connection bar is integrally fabricated in one piece which further simplifies fabrication of the bearing in the support disc.

Advantageously the pin is provided solid or with a thick wall in order to prevent bending.

BRIEF DESCRIPTION OF THE DRAWINGS

Further advantageous can be derived from the subsequent drawing description. The drawing illustrate embodiments of the invention. The drawings, the description and the claims include several features in combination. A person skilled in the art will view the features individually and combine them into useful other combinations, wherein:

DETAILED DESCRIPTION OF THE INVENTION

Figure 2:
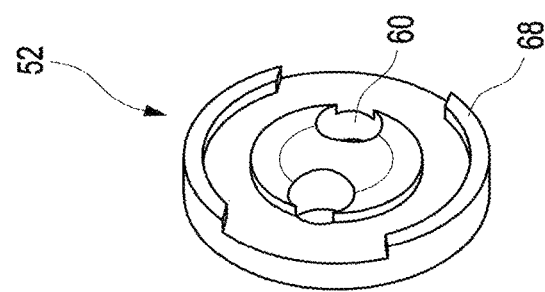
FIG. 2 illustrates a perspective view of a damping element of the actuator according to FIG. 1.

In the drawing figures identical or like components are identified with identical reference numerals. The drawing figures show embodiments of the invention and do not limit the spirit and scope of the invention.

Figure 1:
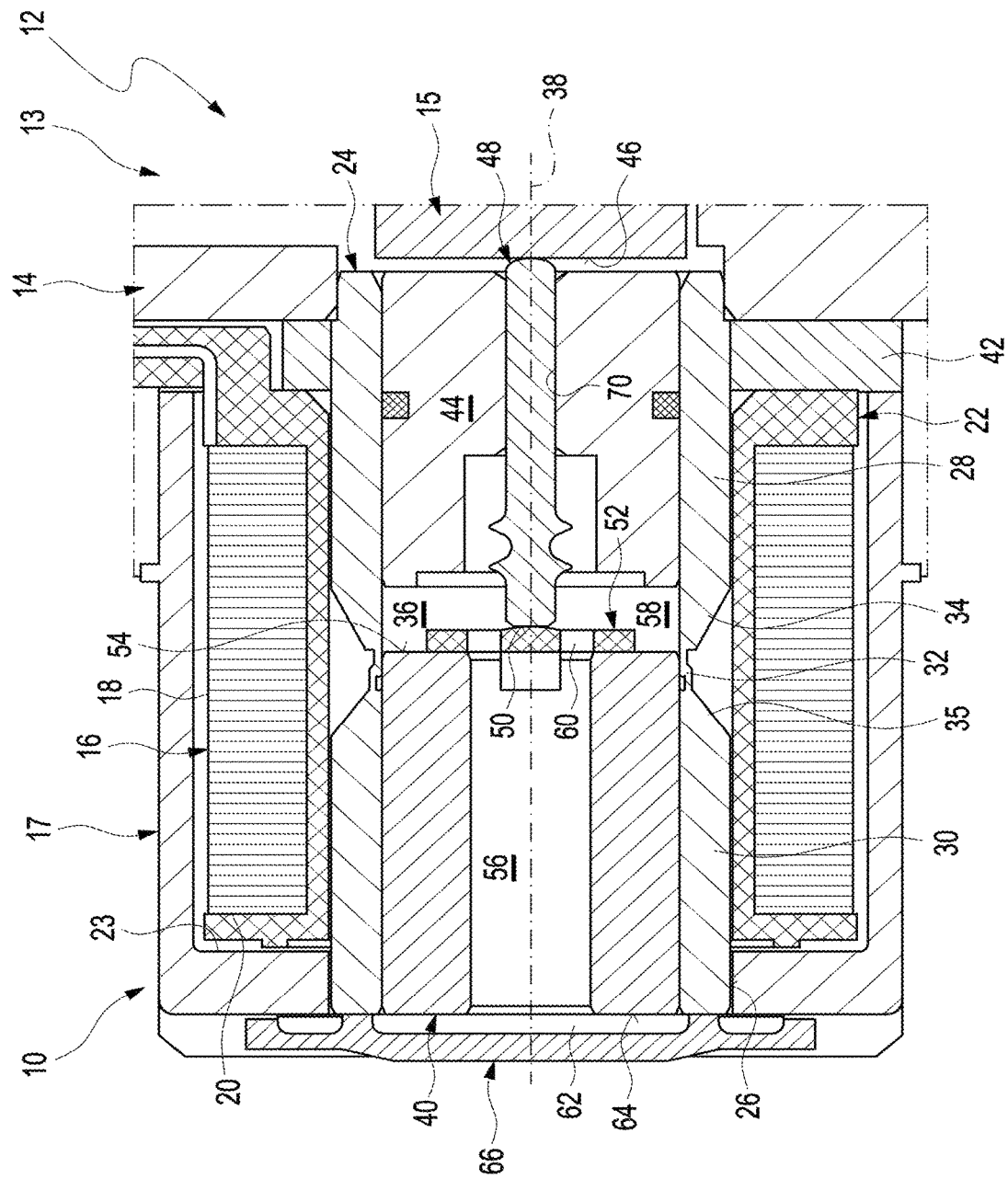
FIG. 1 illustrates a longitudinal sectional view of an prior art actuator for a hydraulic valve.

FIG. 1 illustrates a longitudinal sectional view of a prior actuator 10 of a hydraulic valve 12. The hydraulic valve 12 which is only illustrated with its hydraulic components starting with the actuator 10 includes a control valve 13 including a housing 14 including hydraulic connections and an axially movable hydraulically flowable piston 15 which is received axially moveable in order to open and close flow through openings configured in the housing 14. The piston 15 is axially positioned by the actuator 10.

The actuator 10 includes a magnetisable actuator housing 17 which envelops a magnet coil 16 at an outer circumference 18 and at least at a first face 20 of the magnet coil. The magnet coil 16 is embedded or cast into a carrier element 22, advantageously made from synthetic material in order to provide electrical insulation. The carrier element 22 that is configured with the magnet coil 16 is received in a housing receiver 23 of the actuator housing 17.

The carrier element 22 is arranged between the magnet coil 16 and a pole group 24 wherein the carrier element envelops an enveloping surface 26 of the pole group 24 at least partially.

The pole group 24 which is configured hollow cylindrical in this embodiment is formed by a pole core 28 and a pole tube 30 which are connected with one another in the axial direction by a connection bar 32. The pole core 28, the pole tube 30 and the connection bar 32 are integrally configured in one piece. The pole core 28 is oriented towards the piston 15, whereas the pole tube 30 that is arranged at a face of the pole group 24 that is oriented away from the piston 15 and that closes the pole group 24 by a terminal cover 66 almost entirely so that the pole tube is oriented away from the piston 15.

The connection bar 32 is configured hollow cylindrical and connected with a pole core cone 34 at a side of the connection bar that is oriented towards the pole core 28. By the same token the connection bar 32 is connected with a pole tube cone 35 of the pole tube 30 at a side of the connection bar that is oriented towards the pole tube 30. By the same token also only one of the cones 34, 35 can be provided. An armature 40 is movably arranged along a longitudinal axis 38 of an interior space 36 of the pole group 24.

In order to facilitate assembly the actuator housing 17 is configured hollow cylindrical and includes a pole disc 42 that envelops the pole core 28 at an end of the actuator housing that is oriented towards the piston 15, wherein the pole disc is supported at the carrier element 22 and the actuator housing 17 in the axial direction. By the same token the pole disc can also be pressed into the actuator housing.

The actuator housing 17 can be advantageously configured hat shaped or pot shaped wherein the carrier element 22 that supports the magnet coil 16 can be inserted in the actuator housing 17 in a simple manner and the actuator housing can be covered by the pole disc 42 that is configured to receive the pole group 24.

The interior 36 that is filled with the hydraulic fluid is essentially closed relative to the piston by a support disc 44. The support disc 44 also designated as pole plug is arranged to prevent an excessive outflow of hydraulic fluid from the interior cavity 36 in addition to limiting an axial movement of the armature 40. Thus, the hydraulic fluid that is, provided to facilitate low friction movement and damping of the armature 40 can flow through respective movement channels in the hydraulic piston and/or in the housing, however, the support disc 44 prevents an excessive or complete emptying.

The piston 15 is operatively connected with the armature 40 so that the piston 15 contacts a cylindrical pin 48 that is axially movable along the longitudinal axis 38 with a face 46 of the piston that is oriented towards the armature 40. The pin 48 contacts an anti-stick element 52 at a face 50 that is oriented away from the piston 15 wherein the anti-stick element is arranged at an armature face 54 of the armature 40 that is oriented towards the pin surface 50. Thus, an axial movement of the armature 40 is transferrable to the valve piston 15. The anti-stick element 52 is configured disc shaped and used to prevent an adhesion of the armature 40 at the magnetically conductive support disc 44.

The anti-stick element 52 furthermore substantially closes a pass through opening 56 that is provided in the armature 40, wherein the pass through opening extends centrally along the longitudinal axis 38 in the armature 40. The pass through opening 56 is configured as a bore hole in this embodiment.

The support disc 44 also reliably supports the pin 48 and provides a spatial separation of the magnet portion and the hydraulic portion of the hydraulic valve 12 and is advantageously received in the receiving opening 18 by a press fit and a flush joint with the pole group 24.

The armature 40 is moved electromagnetically wherein the magnet coil 16 provides the electromagnetic field. A current loading of the magnetic coil 16 provides an axial movement of the piston 15, wherein a retaining element e.g. provided as a coil spring at a second face of the piston 15 that is oriented away from the first face 46 imparts a retaining force upon the piston 15 so that the piston 15 has to be moved against the retaining force.

In the illustrated position of the armature 40 an annular space 58 is formed between the armature 40 and the support disc 44. This space 58 is flow connected through a flow through opening 60 that is introduced into the anti-stick element 50 extending through the anti-stick element 52 in the direction of the longitudinal axis 38 and through the pass through opening 56 with another annular cavity 62 wherein the other annular cavity 62 is defined at a second armature face 64 of the armature 40 that is oriented away from the first armature face 54 between the second armature face 64 and defined at the end oriented away from the support disc 44 by a terminal cover that closes the inner cavity 36. This means that a pressure compensation between the spaces 58, 62 can be performed anytime. Thus, the armature 40 only has to perform linear transfer work due to the piston 15 when the piston 15 is moved in a direction that is oriented away from the actuator 10 and thus the armature has a quick reaction time when moving the piston 15. The flow through opening 60 implements a damping effect so that the flow through opening 60 can also be designated as damping element.

FIG. 2 illustrates the anti-stick element 52 in a perspective view. Two flow through openings 60 are provided to facilitate a pressure compensation when the armature 40 is displaced. The anti-stick element 52 includes two bars 68 that are formed with annular sections and are pressed into the armature 40 in order to provide fixing in the armature 40.

Figure 3:
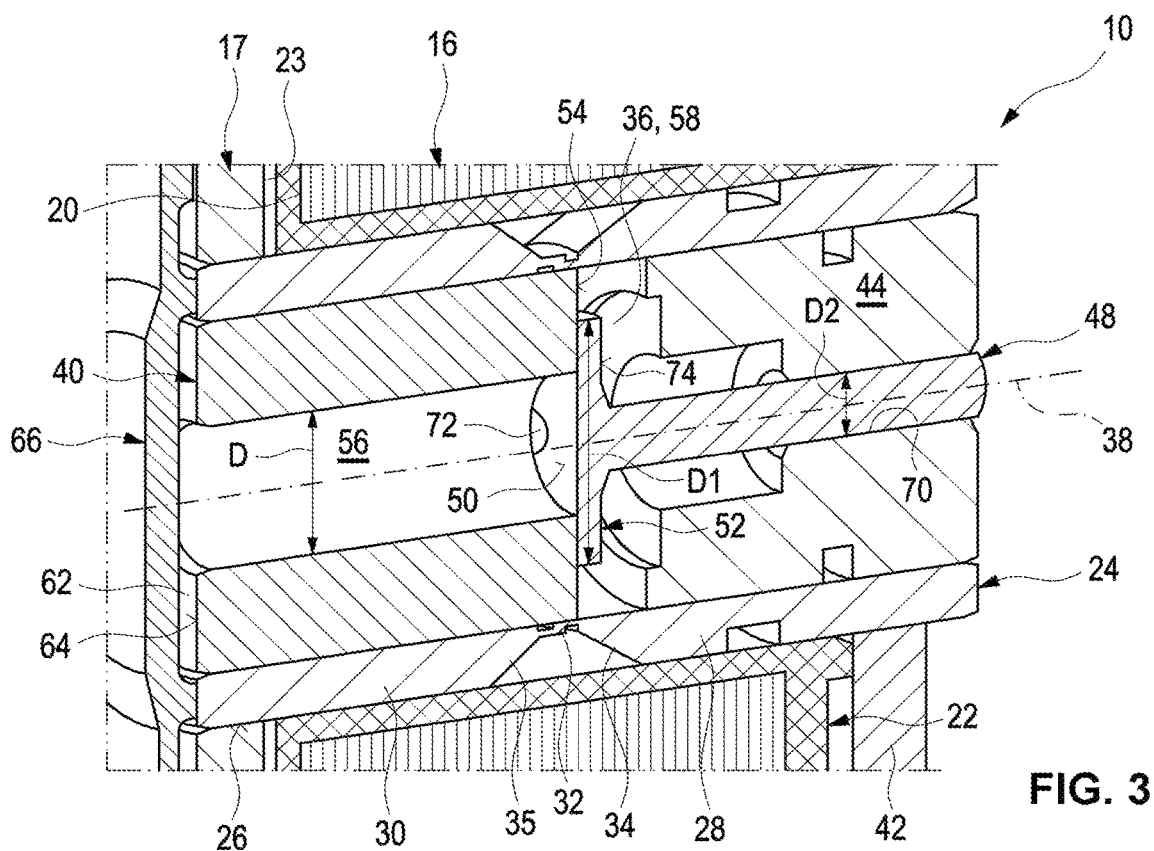
FIG. 3 illustrates a perspective view of an actuator according to the invention in a longitudinal sectional view.
Figure 4:
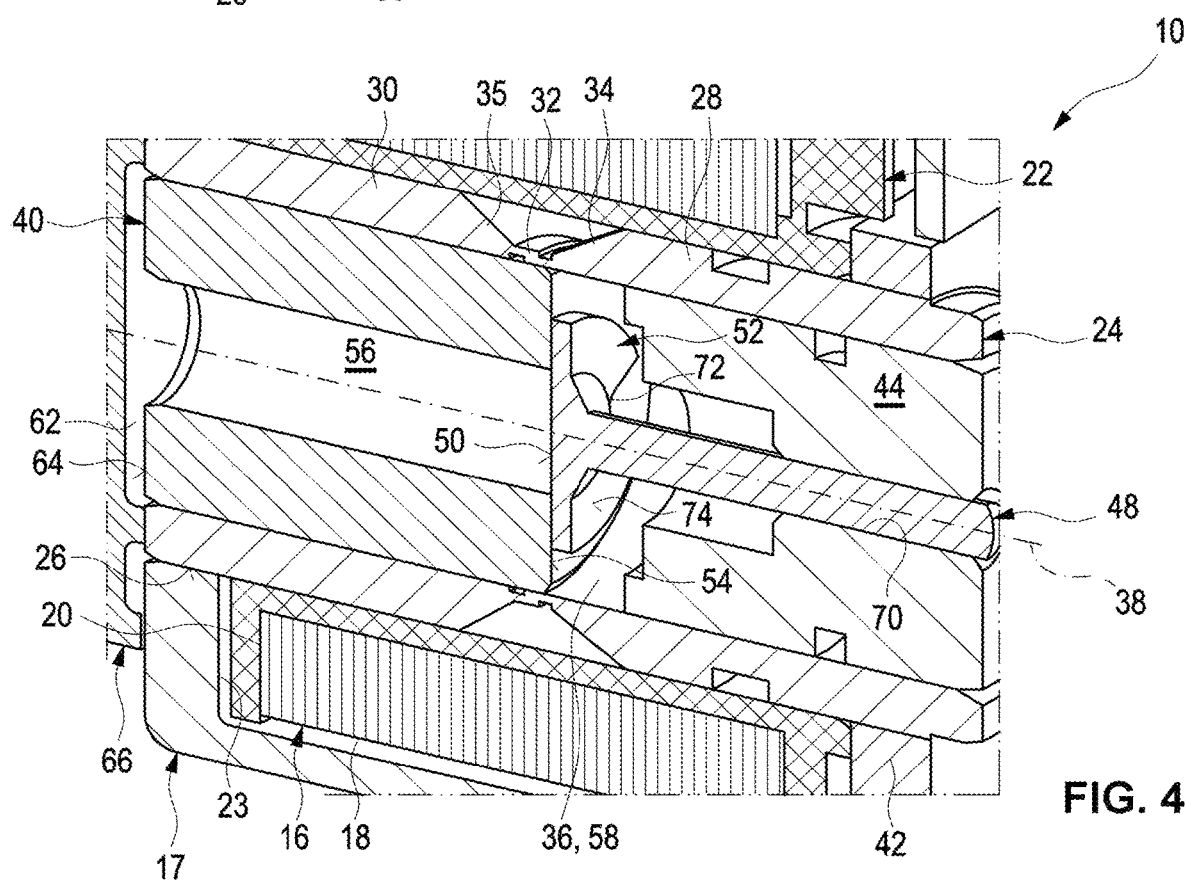
FIG. 4 illustrates another perspective view of the actuator according to FIG. 3.
Figure 5:
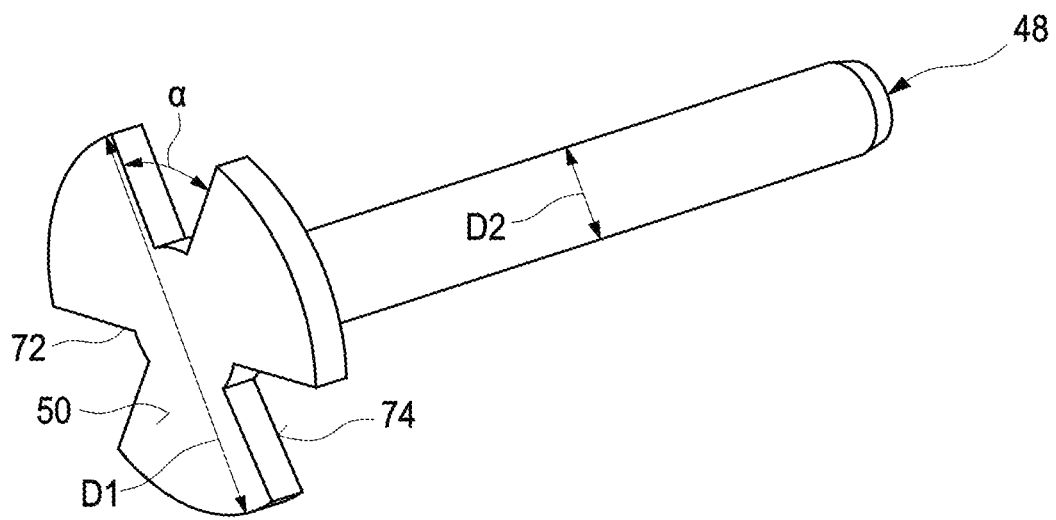
FIG. 5 illustrates a perspective view of a pin with a damping function of the actuator according to the invention.

FIGS. 3 and 4 illustrate an actuator 10 according to the invention in a perspective longitudinal sectional view in two different perspectives. The pin 48 contacts the armature face 54 and is movable relative to the armature 40. Put differently this means that the pin 48 is not fixed at the armature 40. Thus, the pin 48 is not pressed into the armature 40 or fixed at the armature 40 as done in the prior art. During assembly the pin is applied to the armature 40 and secured by the support disc 44 that includes a support opening 70 to support the pin 48. The pin 48 is configured coaxial with the longitudinal axis 38 so that no torques can be generated when the armature 40 is displaced.

In order for the pin 48 not be able to penetrate the pass through opening 56 which would reduce a stroke of the piston 15, the pass through opening 56 has a diameter D that is smaller than a first outer diameter D1 of the pin 48. The pin 48 includes at least two substantially different diameters in the instant embodiment to reduce friction and to facilitate the damping effect, thus the first exterior diameter D1 at an end oriented towards the armature 40 and a second exterior diameter D2 provided at a section of the pin 48 that is supported in the support opening 70. This section is the section of the pin 48 that is configured in the support disc 44 in order to provide secure movement. It is appreciated that other portions of the pin can have other diameters as long as these diameters do not interfere with the movement of the armature 40, the pin 48 and the piston 15. However, providing only a few different diameters is cost effective.

The pin 48 includes at least one recess 72 at an end that is oriented towards the armature 40, wherein the recess 72 is flow connected with the pass through opening 56 that extends through an entirety of the armature 40. Advantageously the recess has an opening angle α that is configured in the circumferential direction and has a value of 45° at the most. In the instant embodiment three recesses 72 are provide that are evenly distributed over a circumference of the pin 48. Their opening angle α is 50°, wherein an opening angle α of 60° should not be exceeded so that pin surfaces 74 formed between the recesses 72 have at least the same size as surfaces of the recesses 72 that are configured to react forces.

Figure 6:
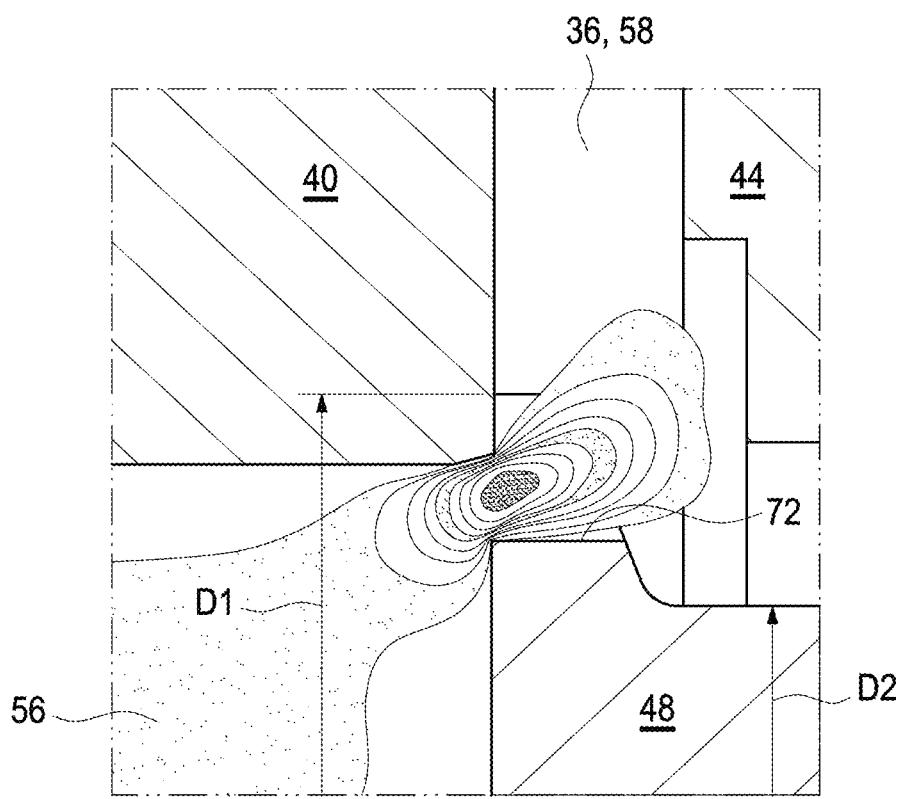
FIG. 6 illustrates isothermal lines in a damping element of the actuator according to the invention.

The recess 72 is configured so that a fluid exchange between the space 58 and the additional space 62 does not impair an adjustment speed of the piston 15 even for a maximum stroke of the piston 15. Thus, the recess 72 is not limited in a radially outward direction. As illustrated in FIG. 6 showing isothermal lines of the hydraulic fluid in the recess 72, a damping element is formed by the pin 48, this means the recess 72 and the recess 56 of the armature 40. Put differently the damping element is formed by two actuator elements, the pin 48 and the armature 40. Thus, an almost ideal aperture can be implemented between the armature 40 and the pin 48 wherein the armature is characterized in that the aperture is configured short and with a sharp edge in the axial direction. The temperatures of the illustrated isothermal lines increase from the slightly dotted area to the strongly dotted area.

Figure 7:
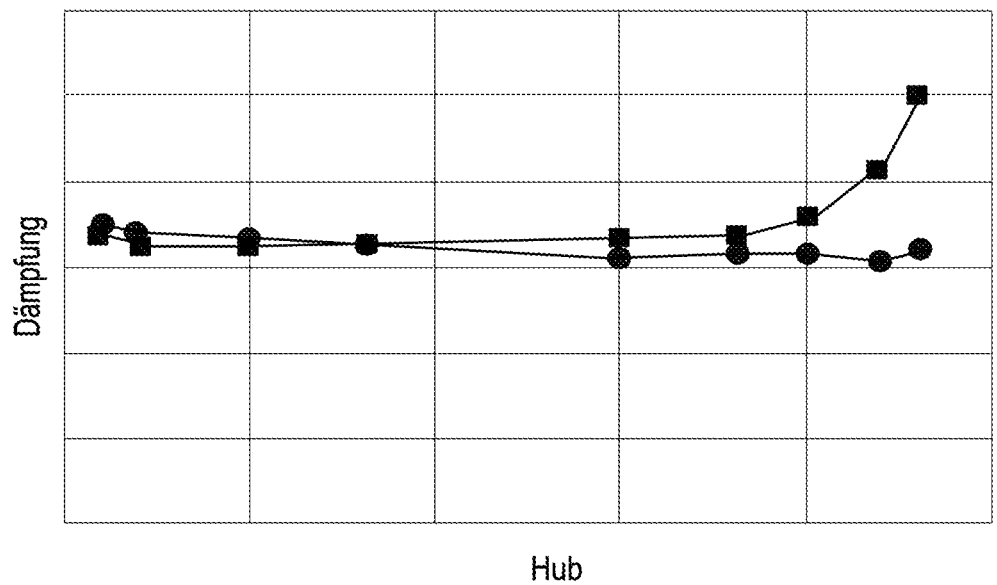
FIG. 7 illustrates a characteristic diagram of the prior art actuator and the actuator according to the invention, showing damping plotted over stroke.
Figure 8:
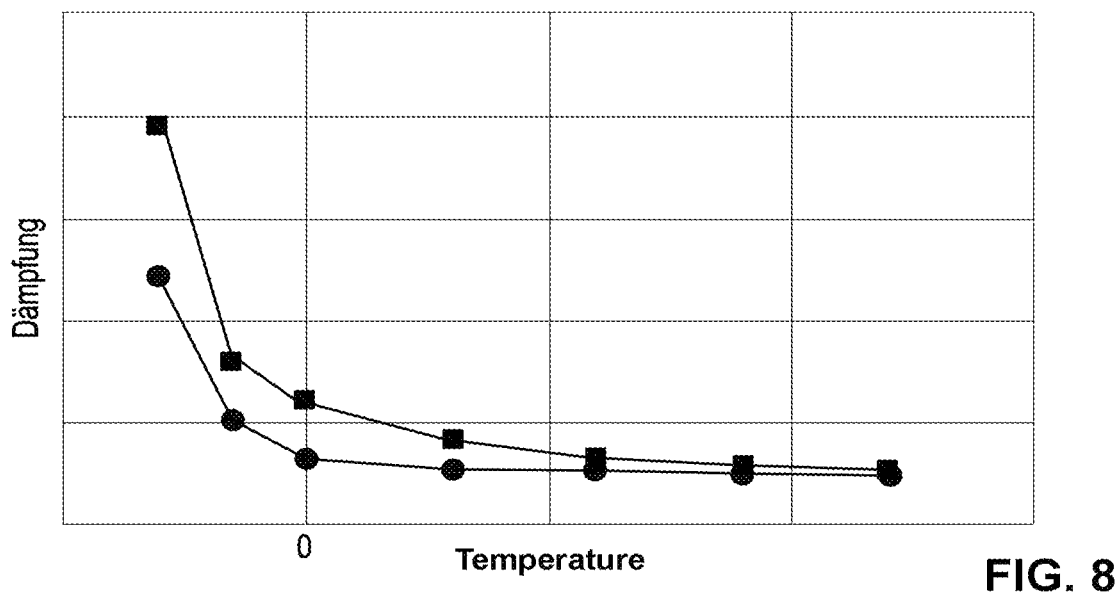
FIG. 8 illustrates a characteristic diagram of the prior art actuator and the actuator according to the invention, plotting damping over temperature.

Since the recess 72 is not limited in the upward direction an indefinitely small axial flow path is formed starting from the pass through opening 56 into the space 58 or vice versa wherein the damping remains almost unchanged even for increasing temperatures of the hydraulic fluid and is reduced at temperatures below 0° C. compared to the prior art. When going to large strokes the damping is greatly reduced compared to the prior art. This is clearly evident from the diagrams illustrated in FIGS. 7 and 8 that plot damping values as a function of stroke or as a function of temperature, wherein the characteristic curves provided with a circle includes values of the actuator 10 according to the invention and the characteristic curves provided with a square include values for the prior art actuator 10.

Furthermore the recess 72 of the pin automatically facilitates a flow around at large strokes so that the damping is hardly a function of the armature position.

In order to avoid an adhesion of the armature 40 at the support disc 44 the first exterior diameter D1 of the pin 48 is configured as an essentially disc shaped non-magnetic anti-stick element 52.

Thus, all functions that are relevant for reliable operations of the hydraulic valve 12, effective contact damping provided by the recess 72, a loss safety provided by a first outer diameter D1 of the pin 48, an anti-stick effect to prevent an adhesion of the armature 40 at the support disc 44 and reliable adjustment of the piston 15 by the pin 48 are integrated into a single element.

What is claimed is:

1. An actuator for a hydraulic stroke or pressure control valve for a motor vehicle, the actuator comprising:
   a magnetisable actuator housing that envelops a magnet coil;
   a pole group arranged in a receiving opening of the actuator housing,
   wherein the pole group includes a pole core and a pole tube,
   wherein an axially movable armature is arranged in an inner cavity of the pole group,
   wherein the armature is configured to axially move a piston of the hydraulic valve by a pin that is supported axially movable in the pole group,
   wherein the actuator is configured to perform an anti-stick function and a contact damping function,
   wherein the pin directly contacts a first armature face of the armature that is oriented towards the pin,
   wherein the pin is configured axially movable relative to the armature, wherein the pin includes at least one recess configured to provide contact damping at an end oriented towards the armature,
   wherein the at least one recess is flow connected with a pass through opening that extends axially through an entirety of the armature when the end of the pin that is oriented towards the armature is in contact with the armature,
   wherein the at least one recess is open in a radial direction and in an axial direction of the pin.

2. The actuator according to claim 1,
   wherein the armature includes a pass through opening that is configured coaxial with the pin and extends through an entirety of the armature, and
   wherein the pass through opening has a pass though opening diameter that is smaller than a first outer diameter of the pin.

3. The actuator according to claim 1,
   wherein the pin includes a first outer diameter at an end oriented towards the armature, and
   wherein the first outer diameter is greater than a second outer diameter of the pin which is configured in a portion of a bearing of the pin.

4. The actuator according to claim 1, wherein a damping element is configured by the at least one recess of the pin together with the pass through opening of the armature.

5. The actuator according to claim 4,
   wherein the at least one recess includes at least two recesses, and
   wherein the at least two recesses are evenly spaced in the circumferential direction.

6. The actuator according to claim 4, wherein the at least one recess has a total circumferential opening angle that has a value of 180° at the most.

7. The actuator according to claim 1, wherein the anti-stick function is provided by a disc shaped non-magnetic anti-stick element.

8. The actuator according to claim 7, wherein the anti-stick element is configured as the first outer diameter of the pin.

9. A hydraulic valve, comprising:
   a control valve and an actuator that is configured to move the control valve,
   wherein the actuator is configured according to claim 1.

* * * * *